Sept. 12, 1961    J. V. FREDD    2,999,320
RELEASE ASSEMBLY FOR TUBING CALIPER
Filed March 3, 1959    5 Sheets-Sheet 1

INVENTOR.
JOHN V. FREDD
BY Robert O. Spindle
ATTORNEY

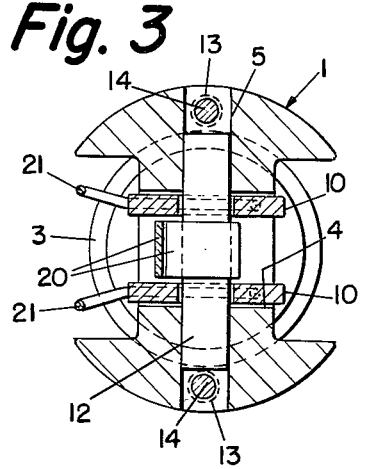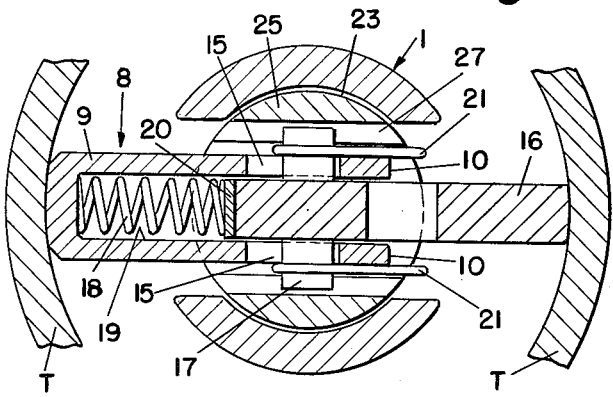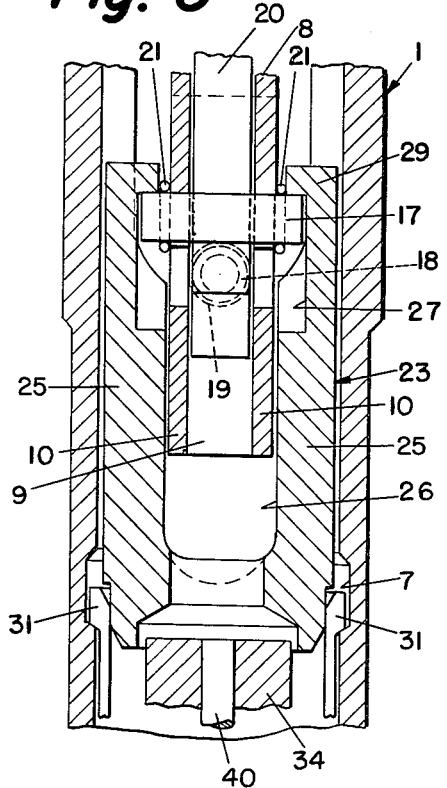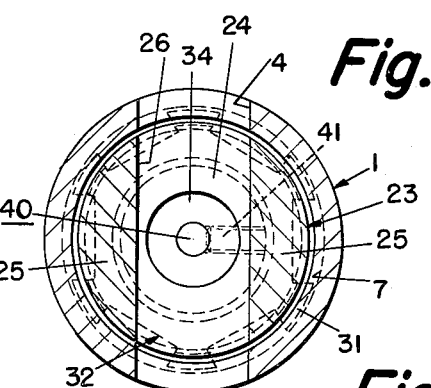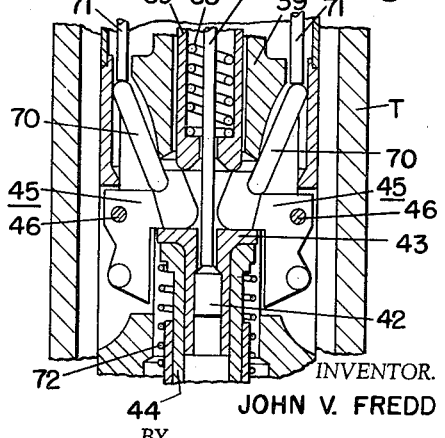

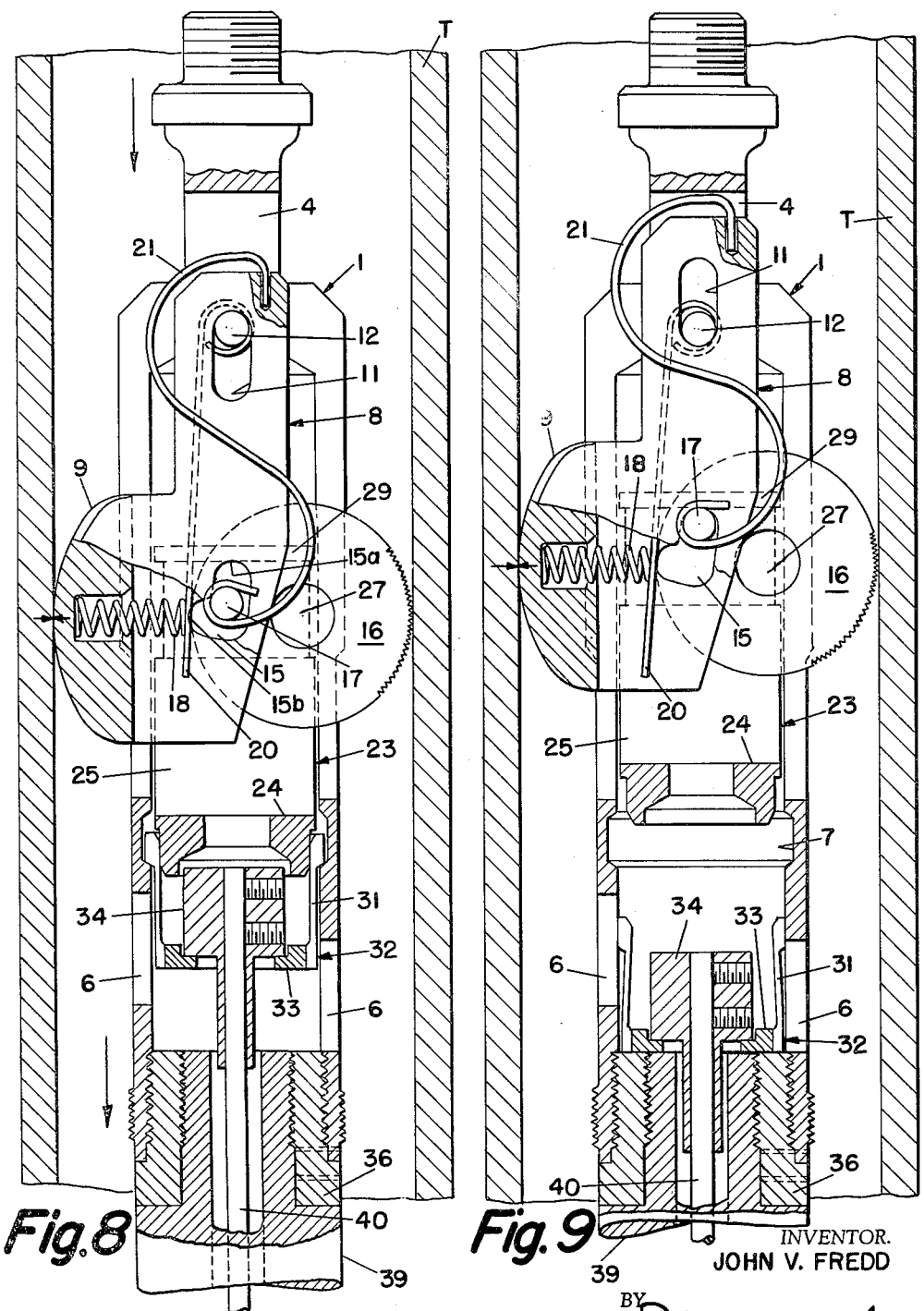

Sept. 12, 1961  J. V. FREDD  2,999,320
RELEASE ASSEMBLY FOR TUBING CALIPER
Filed March 3, 1959  5 Sheets-Sheet 4
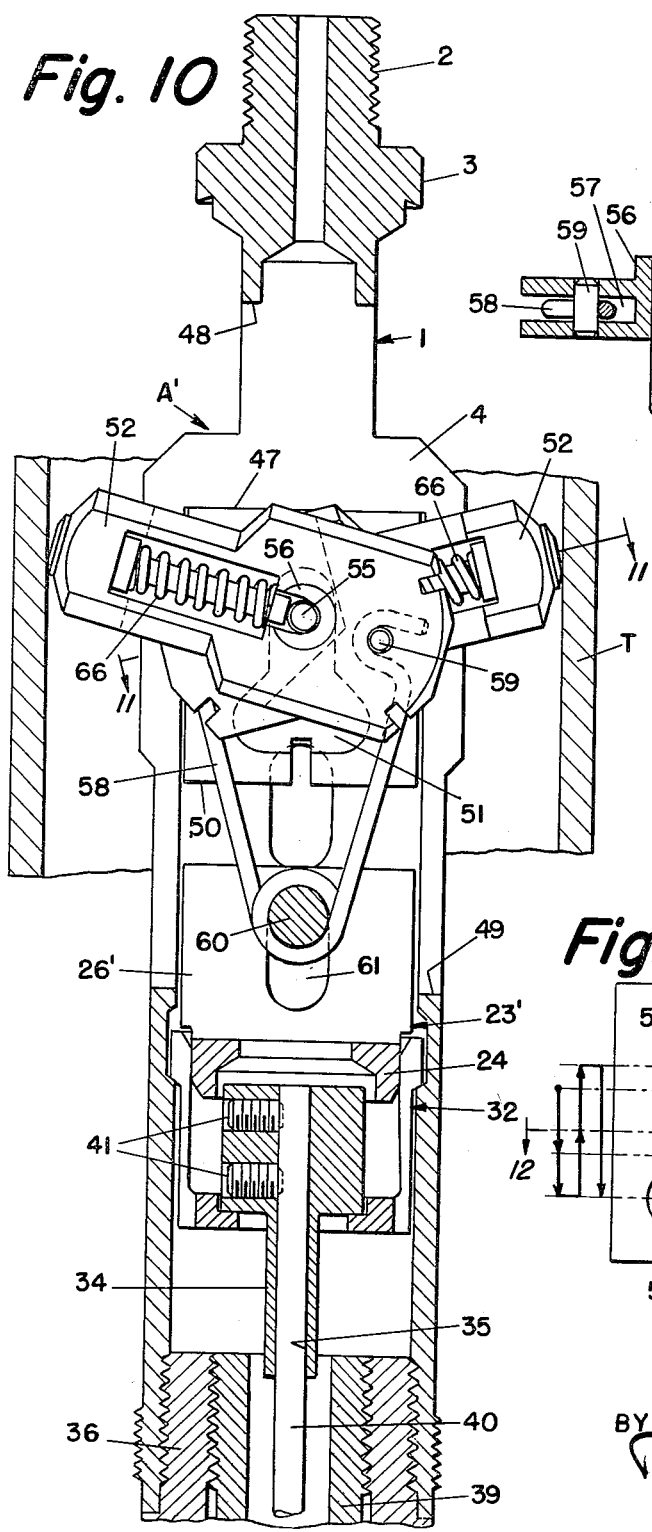
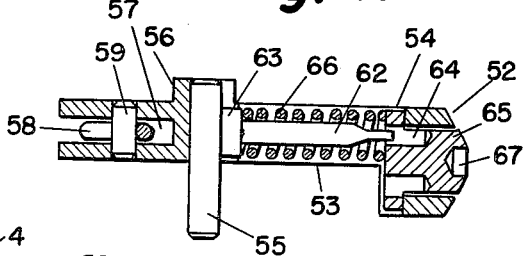
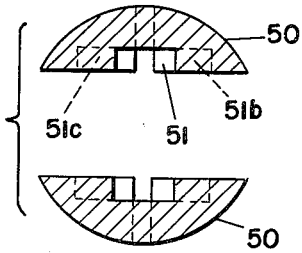
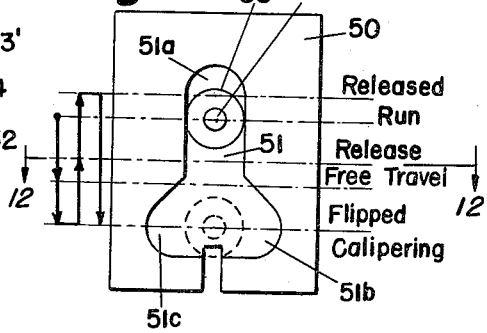
INVENTOR.
JOHN V. FREDD
BY
Robert O. Spindle
ATTORNEY

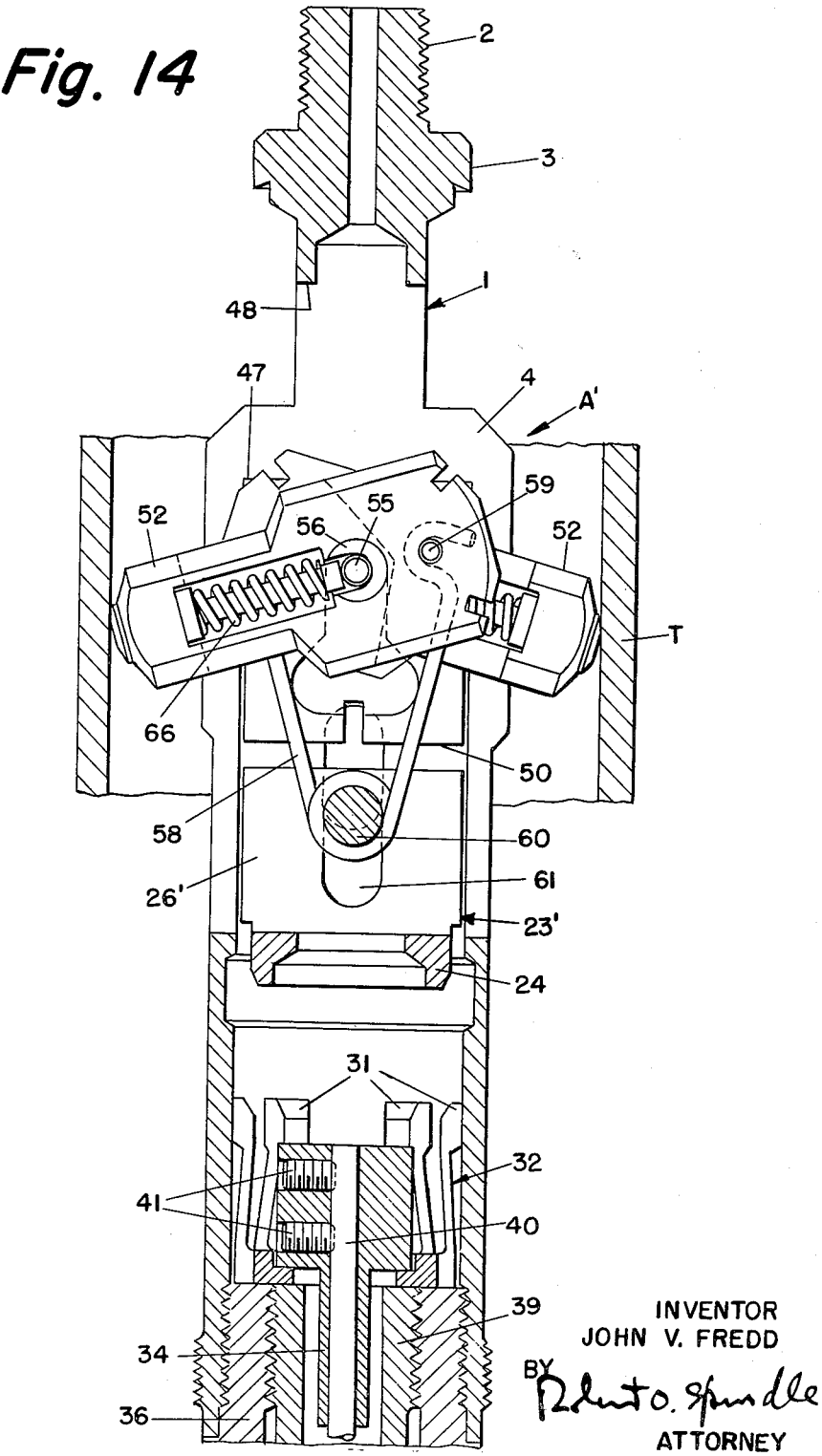

United States Patent Office 2,999,320
Patented Sept. 12, 1961

2,999,320
RELEASE ASSEMBLY FOR TUBING CALIPER
John V. Fredd, Dallas, Tex., assignor to Otis Engineering Corporation, Dallas, Tex., a corporation of Delaware
Filed Mar. 3, 1959, Ser. No. 796,812
23 Claims. (Cl. 33—178)

This invention relates to release assemblies operable from a remote point for releasing a plunger for movement from a first position (in which it is originally locked) to a second position, and more particularly to release assemblies operable remotely for releasing the feelers of a tubing caliper for movement from an original, inoperative position to an operative position. This invention also concerns itself with means for hanging a well tool, such as a caliper, in a tubing string.

When a tubing caliper such as that described in my Patent No. 2,708,316 is run into an extended length of tubing, it is highly desirable that the feelers (which during the calipering operation engage the tubing wall) be retained in a feeler-retracted position, to prevent unnecessary contact between the tubing wall and the feelers as the caliper moves downwardly in the tubing. This will eliminate unnecessary wear on the feeler heads. However, when the caliper has been lowered to the desired level in the tubing, it is necessary to release the feelers to a feeler-extended position, in order that the feelers can contact the tubing wall to caliper it as the caliper is retracted therefrom. This releasing action must of necessity be initiated from a remote point, since the tubing caliper is not accessible when it is inside an extended length of tubing.

In addition, if the means such as the wire line by which the caliper is being retracted from the tubing string becomes broken, or disconnected from the caliper, it is highly desirable that the caliper not be dropped in the tubing, since if it were so dropped, damage thereto might result.

An object of this invention is to provide novel release mechanisms, operable from a remote point, for releasing the feelers of a tubing caliper for movement to a feeler-extended position.

Another object is to provide simple, inexpensive devices for hanging a well tool in a tubing string.

A further object is to provide novel devices for well tools which permit such a tool to be lowered to any desired depth in the tubing and then to be removed therefrom, yet which prevents any substantial lowering of the tool in the tubing after the tool's upward movement has been initiated.

The objects of this invention are accomplished, briefly, in the following manner: a body member, of essentially cylindrical configuration, is adapted to be secured at its lower end to the body portion of a feeler head assembly, such as that described in the copending Boyle application, Serial No. 770,039, filed October 28, 1958, now Patent No. 2,947,086, dated August 2, 1960, and to be secured at its upper end to a conventional fishing neck. Positioned within this body member, and adapted to move longitudinally therein, is a plunger, to which is adapted to be secured a feeler controlling member which is coupled to the feeler head assembly. The arrangement here is such that (longitudinal) downward movement of the plunger, and thereby also of the controlling member, with respect to the body member, permits movement of the feelers to feeler-extended position, that is, to a position wherein the feelers contact the tubing wall. Originally, the plunger is held against downward movement by engagement thereof with the collet portion of a collet whose arms, in turn, are outwardly held in an internal groove in the body member by means of a plug member which fits within said arms and which is mounted for longitudinal sliding movement within the body member. A pair of tubing-contacting members are mounted for conjoint longitudinal movement with respect to the body member, these members extending beyond the outer surface of the body member at respective diametrically opposite sides thereof to contact the tubing wall. In a first embodiment, one of these contacting members is a wheel which is eccentrically mounted in the other contacting member, this eccentric mounting being provided by a pin which is adapted to engage the aforesaid plug member. An initial upward movement of the caliper causes the eccentric wheel to rotate about its eccentric mounting to such a position that it firmly contacts the tubing wall and, in response to a force tending to urge the caliper downwardly, forces both contacting members outwardly to very firmly engage the tubing wall and prevent any substantial downward movement of the caliper. Following the initial upward movement of the caliper, the body of the release assembly is caused to move downwardly to a small extent. This downward movement of the body with respect to the wheel causes the aforesaid pin to lift the plug member out of the collet. The same then becomes unlocked from the body member and is free to move downwardly, thus also releasing the plunger for downward movement. Downward movement of the plunger permits the feelers to be released to feeler-extended position. The caliper may then be drawn upwardly, for calipering purposes. In a second embodiment, the two tubing-contacting members are spring-loaded stop members which are pivotally mounted in the body member. An initial upward movement of the caliper causes these stop members to pivot about their pivot points, to such positions that they firmly contact the tubing wall to prevent any substantial downward movement of the caliper. When the body of the release assembly is caused to move downwardly, following the initial upward movement of the caliper, the stop members lift the plug member out of the collet, unlocking the latter as in the first embodiment and allowing the same to move downwardly, along with the plunger. Downward movement of the plunger again permits release of the feelers to feeler-extended position.

A detailed description of the invention follows, taken in conjunction with the accompanying drawings, wherein.

Figure 1:
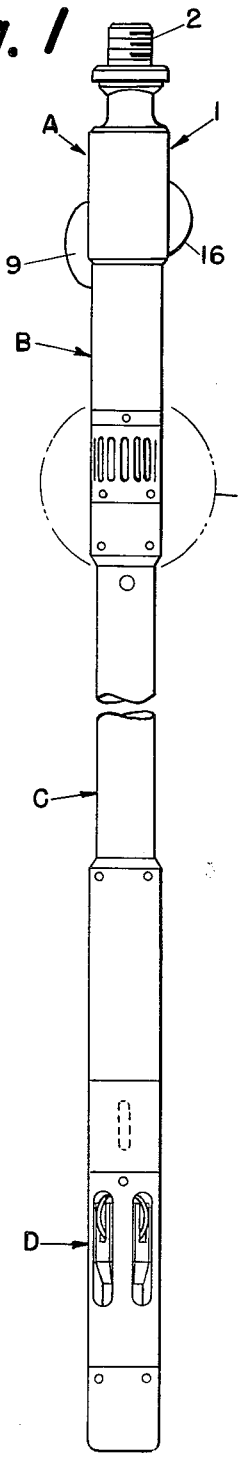
FIGURE 1 is an elevation of a tubing caliper utilizing one novel form of release assembly.
Figure 2:
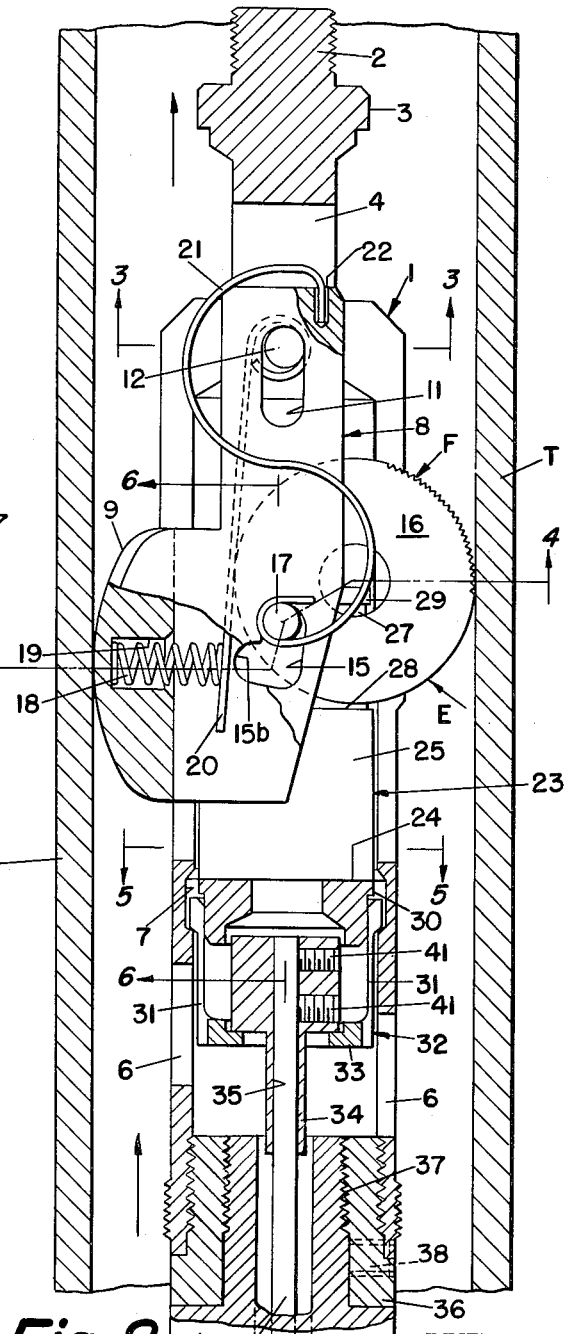
FIGURE 2 is a central longitudinal section through one form of release assembly according to this invention, in position in a tubing string, the parts being shown in feeler-retracted position.

FIGURES 3, 4, and 5 are transverse cross-sections taken on lines 3—3, 4—4, and 5—5, respectively, of FIGURE 2;

FIGURE 6 is a longitudinal cross-section taken on line 6—6 of FIGURE 2, the wheel 16 being omitted from this figure for purposes of clarity;

FIGURE 7 is a partial longitudinal section of the feeler head assembly, covering the area indicated by the legend "FIGURE 7" in FIGURE 1;

FIGURES 8 and 9 are views similar to FIGURE 2, but respectively showing the parts in two different positions;

FIGURE 10 is a central longitudinal section through a modified form of release assembly, the parts being shown in "run" or feeler-retracted position;

FIGURE 11 is a sectional view through one of the stops, taken on line 11—11 of FIGURE 10;

FIGURE 12 is a cross-section of the two supporting members, taken on line 12—12 of FIGURE 13;

FIGURE 13 is a front elevation of one of the supporting members; and

FIGURE 14 is a view similar to FIGURE 10, but showing the parts in a different position.

A complete caliper is shown in elevation in FIGURE 1, as it appears ready for insertion in the tubing or casing to be calipered. It comprises four principal assemblies A, B, C, and D which include sub-assemblies. The principal assemblies are detachable from each other for adjustment and inspection purposes, and are readily disassembled into their several sub-assemblies as well. The release assembly A of this invention is located in the uppermost section of the caliper housing and is arranged to be connected to operating lines, rods, and other tube exploring devices, such as wire line running tools, as will be described further hereinafter. Joined to the release assembly A, the feeler head assembly B is positioned to be controlled by the release assembly. The chart chamber assembly C attached to the feeler head assembly B contains the chart and stylus and the necessary connectors to transmit the feeler movements to the stylus and the rotary motion to the recording elements. At the bottom of the caliper, the ratchet and driving head subassemblies and the transmission forming the drive assembly D are mounted, and constitute the means by which the recording elements are actuated. For purposes of simplification, only so much of the complete tubing caliper will be described as is necessary for an understanding of the present invention. For further details, particularly with regard to assemblies C and D, reference should be made to my patent above mentioned.

A first embodiment of the release assembly A according to this invention (reference now being made to FIGURE 2) includes a body member 1 which is for the most part hollow and is of cylindrical outer configuration. Body 1 has a fishing neck portion at its upper end, with external threads 2 and an external flange 3. Usually the assembly A (and also the rest of the complete caliper, secured thereto) is lowered into the tubing string after being connected to a wire line running tool (which tool has appreciable weight) by means of the threads 2; however, should the assembly become disconnected for some reason, the assembly can be fished for and withdrawn from the well by means of the flange 3.

Body 1 has a longitudinal slot 4 cut entirely therethrough, this slot having a length equal to slightly more than half the length of the body and its upper end being just below the flange 3. The central portion of this slot is made wider than the upper and lower end portions thereof, for a reason which will hereinafter appear. Except for slot 4, body 1 is tubular, having a hollow portion extending from the upper wall of slot 4 downwardly and outwardly through the lower end of the body. The internal bore in body 1, which extends from the lower end of such body to the upper end of the enlarged central portion of slot 4, has a diameter which is greater than the width of the enlarged central portion of the slot. Body 1 has therein a hole 5 (FIGURE 3), which extends through and perpendicular to slot 4, and out each side of the body. This hole is located somewhat above the enlarged central portion of the slot. Body 1 also has four circumferentially spaced slots 6 cut through its cylindrical wall, near the lower end of the body. Preferably, adjacent slots are 90° apart around the circumference of the cylindrical wall, and the two slots comprising one 180° pair are both spaced a common distance from the lower end of the body 1 which is different from the similar common distance of the two slots comprising the other 180° pair. For better illustration, the slots 6 shown in each of FIGURES 2, 8, and 9 are two adjacent slots (90° apart around the circumference), rather than two diametrically opposite slots; the two slots shown in these figures are therefore at different distances from the lower end of body 1. Body 1 also has therein an internal annular groove 7 somewhat below its mid-portion, and just below the lower end of slot 4.

A release shoe 8, which is generally L-shaped, has a single shoe portion 9 (base of the L), and a bifurcated portion (upright of the L) which provides two parallel arms 10 (FIGURE 3). In each of the arms 10, near the respective upper ends thereof, there is an elongated slot 11 which extends entirely through the respective arm, the slots 11 in the two arms being aligned with each other. The elongation of slots 11 is in the longitudinal direction of the arms 10. A pin 12 extends through slots 11 and through hole 5 in the body 1, to mount the shoe 8 in body 1. In this way, release shoe 8 is mounted for longitudinal movement with respect to body member 1, to an extent determined by the upper and lower ends of slots 11, the pin 12 fitting rather snugly in hole 5 in the body. At the same time, shoe 8 is free to pivot or swing about pin 12, as required. Two longitudinally extending tapped holes 13 (FIGURE 3) are provided in body 1, one near each (outer) end of the hole 5. Two set screws 14 are provided, one being threaded in each of the holes 13 to prevent the displacement of pin 12 from hole 5.

In each of the arms 10 of shoe 8, near the lower ends thereof and almost opposite the mid-section of shoe portion 9, there is an L-shaped slot 15 which extends entirely through the respective arm, the slots 15 in the two arms being aligned with each other. The base of the L extends toward the shoe portion 9, while the upright of the L extends almost parallel to the long dimension of slots 11.

A wheel 16 is eccentrically mounted between arms 10, by means of a pin 17 rigidly secured (as by a force fit, for example) in a hole near the periphery of the wheel, and extending through the slots 15 in the arms 10. The pin 17 is made long enough to extend outwardly beyond the arms 10 on both sides, for a purpose which will be explained hereinafter. The shoe 8 and the wheel 16, by means of the construction described, are fastened together and are mounted for conjoint longitudinal movement with respect to body 1, to an extent determined by the upper and lower ends of slots 11 (by means of the pin-and-slot arrangement 11, 12). Also, the shoe 8-wheel 16 subassembly can pivot about pin 12, within body slot 4. The lower and upper portions of slot 4 have such width as to permit free movement therein of the shoe 8. The enlarged central portion of slot 4, previously referred to, is necessary to permit free passage therethrough of the pin 17 which, as stated, extends outwardly beyond the shoe arms 10.

It may be seen that the shoe 8 and the wheel 16 are mounted in slot 4 of the body 1 and extend, through this slot, beyond the outer surface of body 1 at respective diametrically opposite sides thereof; items 8 and 16 are intended to contact the inner wall of the tubing, as will be described. The outer surface of the shoe portion 9 is smooth, and is cylindrical in shape. The entire outer periphery of wheel 16 is suitably roughened, as by providing thereon a multiplicity of ribs running parallel to the axis of the wheel, in order to increase the friction between the surface of the wheel and the tubing wall, thus providing a better "grip" of the tubing wall by the wheel. In order to simplify and clarify the drawings, only a few of these ribs are shown therein; this shows the amount of rotation of wheel 16 during the release operation, as will become apparent hereinafter.

Resilient means are provided for biasing the wheel 16 outwardly, about pin 17, with respect to the shoe 8. A circular recess 19 is provided, facing inwardly, at a point midway of the length of the shoe portion 9. An end portion of the length of a compression spring 18 is disposed in recess 19, this spring extending inwardly from shoe portion 9 between the arms 10. The opposite end of spring 18 abuts the free end of a wheel blade 20, the opposite end of this blade being looped loosely around pin 12 to retain such blade in position between the shoe arms 10. When blade 20 is so positioned and forced inwardly by spring 18, it abuts the periphery of wheel 16 at a point angularly displaced from pin 17 and tends to bias the wheel outwardly about pin 17.

When the release assembly A is moving within the tubing, the arcuate outer face of shoe portion 9, and wheel 16, engaging the tubing on opposite sides of body 1, tend to position this body centrally of the tubing.

Two generally S-shaped tension springs 21 are utilized, one disposed on the outside of each shoe arm 10. Two longitudinally extending recesses 22 are provided, one at the upper end of each shoe arm 10, each recess extending downwardly for a short distance from the upper face of the respective arm. The upper end of each spring 21 is disposed in a respective one of the recesses 22, and the opposite end of each spring is secured around a respective end of pin 17, just outside of the respective arm 10. Springs 21 are so configured that they always tend to bias pin 17 upwardly toward the upper wall 15a (FIGURE 8) of each of the slots 15.

A release plug 23 is positioned loosely within body member 1, in such a way that it is free to move (specifically, to slide longitudinally) with respect to said body member. This plug has a cylindrical lower portion 24, and an upper bifurcated portion which provides two arms 25 extending upwardly to respective internal bosses 29, the space between the arms 25 defining a slot 26 (FIGURE 5). The slot 26 has sufficient width and length to allow free movement therein and therethrough of the shoe 8-wheel 16 subassembly. Preferably, the width of slot 26 is equal to the width of the upper and lower portions of body slot 4. The arms 25 are arranged to slide freely in the internal bore of body 1, in the region of the enlarged central portion of slot 4.

Each of the plug arms 25 has an internal groove 27 therein, extending from its respective upwardly facing shoulder 28 to the respective boss 29 adjacent the upper end of each of the arms 25. The width of slot 26 plus twice the depth of a single one of the grooves 27 (making up the total space between the arms 25, in the region of the groove 27) is preferably just slightly less than the width of the enlarged central portion of body slot 4, while the width of slot 26 in the region of boss 29 is equal to the width of the upper and lower portions of slot 4. The outer ends of pin 17 extend into the grooves 27 and, should this pin be forced upwardly in some manner (such as that to be described hereinafter), the outer ends of this pin will engage bosses 29 to force the release plug 23 upwardly.

The cylindrical portion 24 of the plug 23 has a diameter somewhat less than the diameter provided by the plug arms 25, thereby to provide an external downwardly facing shoulder 30 at the junction of the lower plug portion 24 and the upper bifurcated portion of the plug. The lower portion 24 of the plug is adapted to be originally positioned within the collet arms (six in number, for example) 31 of a collet 32, the shoulder 30 then contacting the upper ends of the several collet arms. The collet portion 33 of collet 32 is below the collet arms 31. Each of the six collet arms 31 has an external boss which, when in the (original) position illustrated in FIGURE 2, is disposed within groove 7 of body 1, and abuts the upwardly facing wall of this groove. Desirably, the upwardly facing wall of body groove 7 may lie at an angle of 70° from a line parallel to the longitudinal axis of the body 1; similarly, the lower or downwardly facing edges of the external bosses may make an angle of 70° with this same line. The bearing angle between the collet bosses and also the upwardly facing wall of groove 7, on the one hand, and the longitudinal axis of body 1, on the other hand, is made quite steep (about 70°, as previously mentioned) in order to prevent excessive friction between the inside surfaces of the collet arms 31 and the release plug portion 24. It is quite unnecessary, but the collet arms 31 could be made such that their normal free diameter is smaller than that of the internal bore in body 1.

It may be seen that, should release plug 23 be forced upwardly so that the lower plug portion 24 moves away from within the collet arms 31, and should collet 32 be forced downwardly in some manner, the collet arms 31 will be cammed inwardly to permit the external bosses to become disengaged from the wall of groove 7. When the latter occurs, the collet 32 is freed so that it can move downwardly within body 1.

A release plunger 34 has an enlarged head at its upper end and a portion of smaller diameter at its lower end. A longitudinal bore 35 extends entirely through plunger 34, from one end to the other thereof. The head of plunger 34 is disposed between the cylindrical plug portion 24 and the collet portion 33 of collet 32. The lower end of the plunger head engages collet portion 33, thereby originally (as long as the collet arms 31 are disposed in body groove 7, thereby preventing downward movement of the collet) preventing downward movement of the plunger. However, when the collet 32 is freed to permit movement thereof downwardly within body 1, the plunger 34 can also move downwardly, along with the collet.

The extreme lower end of body 1 is internally threaded, and a bushing or release sub 36 is threadedly secured in this end of body 1 by means of external threads on the release sub which match the threads on body 1. The release sub 36 is internally threaded at 37. A feeler head assembly B, which may for example be exactly similar to that shown and described in the aforementioned Boyle application, may be secured to the lower end of the release previously described. A portion of the feeler head assembly is shown in FIGURE 7. In this connection, it is desired to be pointed out that FIGURES 2 and 7 show the various parts of the release assembly of this invention in the locked or feeler-retracted position, in which position the feelers are held while the tubing caliper is lowered down the tubing string, and until the survey or calipering is to begin. The feeler head body 39 has at its upper end external threads which engage the internal threads 37 of release sub 36 to secure head body 39 to the lower end of the release assembly body 1. This threaded connection of body 39 to release sub 36 is secured by a set screw 38 which threadedly engages the cylindrical wall of release sub 36 and bears against the upper end of body 39.

The plunger bore 35 receives the release rod 40 of the feeler head assembly of the caliper. One or more set screws 41 are threadedly inserted in the head of plunger 34, and extend into plunger bore 35 to secure release rod 40 therein. In fact, it may be stated that release rod 40 is inserted in bore 35 and is secured to plunger 34 by set screws 41. The slots 6 at the lower end of body 1 allow the screws 41 to be tightened from outside such body.

The feeler head body 39 has a central longitudinal bore extending entirely therethrough. The release rod 40 extends downwardly through this bore, and terminates in a head 42 (see FIGURE 7) which projects through the central bore in a bushing-like head or cap 43 which is secured to the top of a hollow cylindrical stylus rod 44. The lower surfaces of the inner ends of the feelers 45 engage the upper surface of cap 43. In the locked or feeler-retracted position illustrated in FIGURES 2 and 7, the upper surface of head 42 engages an internal undercut shoulder provided on cap 43, thus pushing upwardly against cap 43 and the inner ends of the feelers. Thus, the feelers are held in the retracted position (out of contact with the wall of tubing T) for running the caliper into the tubing string preliminary to the surveying operation.

A release bushing, centering spring, and centering plunger construction is provided; this construction may for example be exactly like that disclosed in the aforementioned Boyle application. A release bushing (not shown in FIGURE 7) is retained in position in the bore in body 39, near the upper end of such bore; this bushing retains the release rod 40 slidably aligned in body 39 and also provides a fixed upper abutment for the centering spring 68.

A centering plunger 69 is slidably mounted within the bore of body 39, and provides a lower bearing surface for spring 68. The lower end of plunger 69 is adapted to engage or contact the upper surfaces of the inner ends of the feelers 45. After the feelers are released to their tubing-contacting position, the action of spring 68 moves the centering plunger 69 downwardly with some force against the inner ends of the feelers 45, urging the latter outwardly against the wall of the tubing T with equal force, thus minimizing the errors which would arise due to the center line of the caliper moving away from the center line of the tubing string T.

The compression spring 68, pressing plunger 69 downwardly against the top of the feelers 45, produces a force through the latter against cap 43, which force is transmitted to head 42 in engagement with the shoulder under cap 43. In this manner, spring 68 exerts a downwardly directed force on rod 40 which tends to move this rod (and thereby also plunger 34, to which the rod is secured) downwardly within body 1 and feeler body 39. Originally, that is, before the releasing action takes place, downward movement of the plunger 34 is prevented from occurring by the action of collet 32, which engages this plunger and which is then held in position in groove 7 of body 1. When plunger 34 is released from the locked position illustrated in FIGURE 2 due to the release of the collet arms 31 from body groove 7, plunger 34, and also rod 40, move downwardly, causing head 42 to move away from cap 43 to an extent sufficient to permit the feelers 45 to pivot so that their outer ends move outwardly to contact the tubing wall.

There are a plurality of feelers arranged in generally circumferential fashion about the caliper, two of these feelers 45 being illustrated in the drawings. Each of the feelers is in the form of a bell crank with an inwardly extending arm and a downwardly extending arm pivoted by the pin 46. The downwardly extending arm of each feeler is provided with a hardened contact surface which is adapted to move into and out of corrosion pits in the tubing T; the inwardly extending arm of each feeler is provided with a lower contacting surface which is adapted to engage the upper surface of cap 43 on the stylus rod 44.

A feeler rod, feeler operating spring, and spring guide construction is provided; again, this construction may be exactly like that shown in the aforementioned Boyle application. The base of a neck provided on the top of the inwardly extending arm of each feeler 45 (see FIGURE 7) is designed to receive a corresponding feeler rod 70 which spring loads its respective feeler and normally pivots it outwardly to contact with the tubing T. This spring loading is done by an arrangemetn of individual spring guides 71 surrounded by individual feeler operating springs (not shown), the spring guides bearing against individual feeler rods 70 and transmitting the thrust of the operating springs to feelers 45 and stylus cap 43. The feeler rods 70 are rounded both at the top and bottom to engage the lower ends of the spring guides 71 and to seat in the neck bases on the inwardly extending arms of the feelers 45.

Each of the feeler operating springs (compression springs) exerts a downwardly directed force against its respective feeler rod 70, and through the feeler 45 and stylus cap 43 to head 42 (when the latter is in the feeler-retracted position shown in FIGURES 2 and 7); thus, these feeler operating springs exert a downwardly directed force against rod 40 which also tends to move this rod and plunger 34 downwardly within body 1 and feeler body 39. The feeler operating springs therefore also assist in the movement of plunger 34 downwardly when the collet 32 (which originally engages and holds the plunger in its uppermost position) is released from body groove 7. By way of example, the combined downwardly directed force of the single centering spring 68 and the forty feeler operating springs (one for each of the forty feelers) is about 400 pounds.

During the actual calipering operation, the feeler operating springs cause the downwardly extending arms of the feelers 45 to move outwardly into contact with the tubing wall against the restoring force of a stylus lift spring 72, and to move into and out of any corrosion pits therein. The stylus rod 44 is mounted for axial movement in response to calipering (inward and outward) movements of the feelers 45, the stylus cap 43 being engaged by the inwardly extending arms of the feelers.

It will be assumed that, with the parts of the release assembly A in the position shown in FIGURE 2, and with the feelers 45 in their retracted position as in FIGURE 7, the feeler head 39 is screwed into the release sub 36, and is secured thereto by tightening set screw 38. Also, the upper end of release rod 40 (which may be termed a feeler controlling member, since downward movement of this rod permits the feelers to move to a feeler-extended position) is inserted into the bore 35 of plunger 34 an amount such that the rod head 42 engages the shoulder under stylus head 43, with the feelers held in the retracted position, as by means of a suitable retraction tool. At this time, the plug 23 has a position such that its cylindrical portion 24 is within the collet arms 31, holding the bosses on these arms in body groove 7; the collet portion 33 of collet 32 engages the head of plunger 34, preventing downward movement of the plunger. Rod 40 is then secured in the bore of plunger 34 by tightening set screws 41; the access slots 6 permit tightening of such set screws from without the body.

In the original position described, the feelers 45 are held in thier retracted position due to the engagement of release rod head 42 with the shoulder under stylus head 43, and the engagement of the latter with the inwardly-extending arms of the feelers. See FIGURE 7. The release rod 40 is in turn secured to the plunger 34 by means of set screws 41, and downward movement of the plunger with respect to body 1 is prevented by the engagement of the plunger head with the collet portion 33 of collet 32; the collet arms, and therefore the collet also, are held in position in body groove 7 by the cylindrical portion 24 of release plug 23. This original or feeler-retracted position is illustrated in FIGURE 2.

With the release assembly A connected to the feeler head assembly B, as described, and thereby also connected to the other parts of the tubing caliper, the fishing neck is connected (as by means of threads 2) to a wire line, by means of a running tool or other similar tool; such a tool has appreciable weight. Then, the assembly of wire line, release assembly, and caliper is lowered into the tubing string to the desired depth. During this downward displacement in the tubing, the cylindrical outer surface of shoe portion 9 rides along one portion of the tubing wall, and the outer surface of wheel 16 rides along the diametrically opposite portion of the tubing wall. During this downward displacement, the cylindrical outer surface of shoe portion 9 and wheel 16 tend to position the body 1 in the center of the tubing. They thus perform a function somewhat similar to that performed by the so-called "loading wheels" in my aforementioned patent.

By utilizing a wheel 16 of appropriate diameter, the release assembly of the invention can be made to operate in tubing of a particular diameter; by changing the wheel 16 to one of a different diameter, the release assembly can be made to operate in tubing of a different diameter.

During the downward displacement of the caliper in the tubing, blade 20 and spring 18 tend to bias the wheel 16 outwardly about pin 17, in opposition to the force exerted by the tubing wall in the direction of the arrow E. This force has an inward component and an upward component. When obstructions, etc., are encountered during this downward movement, the wheel 16 will be forced inwardly against the blade 20 and spring 18 to pass such obstructions. During this downward travel of the caliper, a plane through the center of wheel 16 and the center of pin 17 would lie in the direction illustrated in FIGURE 2. Also during this time, of course, the feelers of the caliper are maintained in retracted position, as explained previously.

When the desired level in the tubing string is reached, the downward displacement is stopped, and the release assembly is then pulled upwardly, by means of the wire line previously referred to. At this time, the force exerted on wheel 16 by the tubing wall is in the direction of the arrow F. This force, which has an inward component and a downward component, urges the wheel 16 inwardly and pin 17 downwardly to approach wall 15b of slots 15, this latter wall being that at the base of the L of slots 15, nearest the shoe portion 9 of shoe 8. This is illustrated in FIGURE 8, which shows the parts in an intermediate position. While pin 17 so moves, and due mainly to the fact that the roughened outer periphery of wheel 16 gets a good "bite" on the tubing wall, the wheel 16 begins to rotate clockwise, essentially rolling on blade 20. This rotated position is shown in FIGURE 8, wherein the wheel rotation may be seen upon a comparison with FIGURE 2. The periphery of pin 17 is free to rotate, as required by this action, within the slots 15. Also, the L shape of slots 15 (with a portion thereof extending toward shoe portion 9) provides the transverse clearance necessary for the rotation of wheel 16 about the center of pin 17. In this latter connection, it will be recalled that pin 17 is located eccentrically with respect to wheel 16.

At this instant, just after wheel 16 has rotated as described, springs 21, acting on pin 17, cause the pin to return to the upper wall 15a of slots 15, as shown in FIGURE 9, which illustrates the position assumed by the parts in the feeler-extended condition. Pin 17 now again abuts wall 15a of slots 15 and abuts also the internal bosses 29 of release plug 23. This movement of pin 17 produces further (clockwise) rolling of wheel 16 on blade 20, the wheel rotating to a final position (illustrated in FIGURE 9) wherein the plane through the center of wheel 16 and the center of pin 17 is approximately 60° clockwise from its position in FIGURE 2.

With wheel 16 rotated as described to the position illustrated in FIGURE 9 (so that the plane through the center of wheel 16 and the center of pin 17 is directed downwardly and outwardly on the wheel side of the caliper), the force exerted on the wheel by the tubing wall would be in the direction of the arrow E (FIGURE 2), should downward movement of the caliper be initiated. Now, since the cylindrical outer surface of shoe portion 9 abuts one portion of the tubing wall, and the outer surface of wheel 16 abuts its diametrically opposite portion, and since pin 17 abuts the upper wall 15a of slots 15, the result will be that pin will act in the slots 15 of shoe 8 in such a way as to tend to force the wheel 16 and shoe 8 apart, and downward displacement will be prevented due to the engagement of the shoe 8-wheel 16 assembly with the tubing wall. In other words, wheel 16 and shoe 8 will firmly engage the tubing wall when downward displacement of the caliper tends to occur under these conditions, and the engagement of pin 12 (fastened to body 1, and thereby also to the rest of the tubing caliper) with the bottom of slots 11 in shoe 8 will prevent any substantial downward movement of the caliper that is subsequent to the initial upward pull thereof. Thus, when the release assembly A and caliper are being withdrawn or retracted from the tubing string, should the wire line become broken, or disconnected from the release assembly for any reason, the release assembly of this invention will prevent the caliper from falling back (downward) in the tubing string.

Following the initial upward pull on the release assembly, which pull as described adjusts the assembly to a position wherein dropping of the release assembly and caliper in the tubing (after upward movement thereof has once been initiated) is prevented, the strain on the wire line is released, to permit the wire line tools to apply their weight to the top of the body 1. This forces the body 1 downwardly with respect to the shoe 8-wheel 16 subassembly, the shoe-wheel subassembly resisting such downward movement due to the upwardly and inwardly directed force E exerted by the tubing wall on wheel 16, transmitted through pin 17 and slot wall 15a to shoe 8. This last-mentioned resistance to downward movement of the subassembly 8, 16 has been more fully described in the preceding paragraph. This downward movement of body 1 with respect to the subassembly 8, 16 continues until pin 12 (which is fastened in body 1) reaches the bottom or lower wall of slots 11, as shown in FIGURE 9. For convenience, in FIGURE 9 the subassembly 8, 16 is shown as having moved upwardly from its position in FIGURE 8. However, if the index marks (on tubing T and shoe portion 9) on FIGURES 8 and 9 are brought into the same horizontal plane, it will be seen that actually the body 1 has moved downwardly in FIGURE 9, relative to its position in FIGURE 8.

Downward jarring by the wire line tools can also be applied to force the body 1 downwardly, but this latter action should not normally be necessary to operate the release assembly.

Downward movement of body 1 with respect to subassembly 8, 16 has as its equivalent the upward movement of pin 17 with respect to the body, since this pin is a part of the subassembly 8, 16. As pin 17 moves upwardly, it engages the plug bosses 29 and forces plug 23 upwardly so that the lower portion 24 of the plug is withdrawn from within collet arms 31. When the plug portion 24 is so removed from within the collet arms 31, the force holding the external bosses on these arms outwardly, into engagement with body groove 7, is removed. When the collet arms 31 are so released from engagement with the body 1, the forces (downwardly-acting) exerted by the centering spring and by the feeler operating springs in the feeler head assembly B move plunger 34 and collet 32 downwardly within the body 1, until the collet portion 33 abuts the upper end of the release sub 36. This latter abutment provides a lower limit for the downward movement of the collet and plunger. The positions of the various parts of the release assembly are then as shown in FIGURE 9.

Once the collet arms 31 have been released by the movement of the release plug 23 upwardly from its original position within such arms, the resultant force acting downwardly on the plunger 34 causes the same, along with the collet 32 engaged thereby and along with release rod 40 secured thereto, to move downwardly as described previously. This causes rod head 42 to become disengaged from the shoulder under stylus rod cap 43 and to move downwardly within the hollow stylus rod 44 to an extent sufficient to release the stylus rod 44 and the inwardly extending arms of the feelers 45 for free downward movement, the downwardly extending arms of the feelers then pivoting outwardly to engage the tubing wall. The feelers are then in the feeler-extended position. The downward movement of the inner ends of the feelers 45 and of the stylus rod 44 is limited by the contacting of the outer ends of the feelers with the tubing wall. The rod head 42 moves downward an amount sufficient to prevent any possible interference thereof with the axial movement of the stylus rod 44 or of the cap 43 during the calipering operation.

Summarizing the releasing action described, such action releases the feelers 45 for engagement with the tubing wall, and now the caliper, including the release assembly A and the wire line assembly, can be retracted or drawn upwardly in the tubing, to caliper the tubing wall.

FIGURE 9 illustrates the relative positions of the various release assembly parts in the feeler-extended position, that is, in the position occupied when the caliper is ready to be withdrawn or retracted from the hole, for the actual calipering operation. The plunger 34 and collet 32 are in their final (or lowermost) positions, the release plug 23 is in its raised position, and wheel 16 is in its final, "rotated" position. Pin 12 is at the lower end of slots 11, ready to return to the upper end of these slots due to upward movement of body 1 (to which pin 12 is fastened) when upward travel of the caliper is begun.

The release assembly A has now performed its releasing function, and it enables (due to its mechanical connection to the other assemblies of the tubing caliper) the caliper to be retracted from the tubing string as the wire line assembly is pulled upwardly. In this connection, it will be noted that the collet portion 33 of collet 32 now engages the release sub 36 secured to body 1, causing the plunger 34 (which engages such collet portion) to be drawn upwardly with body 1.

As previously described, an initial upward movement of the release assembly (after the caliper has been lowered to the desired depth in the tubing) causes wheel 16 to be rotated about pin 17 to a position wherein it functions to prevent the release assembly and the caliper from being dropped in the tubing. However, this does not prevent the release assembly from being pulled upwardly in the tubing string, since wheel 16 will now abut blade 20 at the position illustrated in FIGURE 9. When obstructions, etc., are encountered during the upward movement of the caliper, the wheel 16 will be forced inwardly against the blade 20 and spring 18 to pass such obstructions.

The four slots 6 in the lower end of body 1, previously referred to, serve a number of purposes, none of which is critical with regard to shape, size, or location. Of prime importance, of course, is the provision of access to the internal parts (particularly to set screws 41) while retracting the feelers, prior to going into the tubing string. Operation in the presence of paraffin, scale, sand, etc. requires adequate "ventilation." The bottom ends of the lower 180° pair of slots are flush with the top of the release sub 36 and the top of the feeler head body 39, to minimize the accumulation of solids that might prevent complete release travel. The bottom ends of the upper 180° pair of slots are available as fulcrums on which a screwdriver or similar tool can be used, to move the collet 32 upwardly to the feeler-retracted position illustrated in FIGURE 2. The slots 6 also serve as windows, for inspection and cleaning purposes.

It is to be noted that the release assembly of this invention serves the purpose of releasing the feelers of a caliper as described, and also serves to prevent the release assembly and caliper from being dropped in the tubing, after upward movement has once been initiated.

It is further to be noted that the release mechanism is suspended from pin 12, to avoid any interference with the operation of the caliper.

The foregoing constitutes a description of one embodiment of a release assembly according to this invention. There will now be described, in connection with FIGURES 10–14, a modified construction comprising another embodiment of the release assembly. In this modified construction, parts identical to those in the first embodiment are denoted by the same reference numerals.

Body member 1 is the principal structural member of the modified release assembly A'. Threads 2 and flange 3 are employed in the same manner as in the embodiment previously described. Body 1 is tubular (that is, it has a cylindrical outer configuration and an internal bore) from the downwardly facing shoulder 47 to the bottom of the release sub 36, which latter is at the bottom of the release assembly. Slot 4 extends through the body 1, from the downwardly facing shoulder 48 to the upwardly facing shoulder 49. As in the embodiment previously described, the slot 4 may have a central portion which is wider than the upper and lower end portions thereof.

Two segmental supporting members 50 are secured, as by welding, in body 1, one at each side thereof. The two members are aligned with each other, and there is a space therebetween which is aligned with slot 4. It is to be noted that the members 50 each have one flat face, facing the interior of body 1, and one cylindrical surface, which latter faces toward the exterior of body 1, matches in curvature the internal bore wall of body 1, and is firmly secured to the wall of such bore. The supporting members 50 will be described in more detail hereinafter.

The lower portion 24 of the release plug 23' and all parts of the release assembly below a horizontal plane passing through the upper end of this lower plug portion 24, are identical to their counterparts in the first embodiment, previously described, so will not be described further herein.

As illustrated in FIGURES 12 and 13, each of the supporting members 50 has a somewhat keyhole-shaped groove 51 therein extending inwardly for a short distance from its flat face. Groove 51 has a portion 51a of small width and a wider portion with two lobes 51b and 51c. The grooves 51 in the two members 50 are aligned with each other, and the wider portion of each groove is toward the bottom of the members 50.

Two identical stop members 52 each having an inner flat surface 53 and an outer flat surface 54 (see FIGURE 11) are positioned in the space between members 50. They are retained therein by a single pin 55 which extends through a hole provided in each of the stops 52, the outer ends of the pin each extending into a respective slotted sleeve 56 secured to the outer flat face of each respective stop member and extending outwardly therefrom. The two sleeves 56 in turn are positioned each in a respective groove 51 of a corresponding supporting member 50. The slot in each of the sleeves 56 opens toward the outermost end of the corresponding stop member 52, for a purpose which will be described hereinafter.

The stops 52 can move longitudinally with respect to the release assembly A', since sleeve 56 on each of them can slide within grooves 51 of the supporting members 50. Also, the stops 52 are each free to rotate about pin 55, independently of each other. The length of each of the stops 52, from pin 55 outwardly to its outer end, is greater than the radius of the tubing in which the release assembly is to be employed. Therefore, the stops are directed outwardly and upwardly during downward displacement of the release assembly A' in the tubing, as illustrated in FIGURE 10.

Each of the stops 52 has a bifurcated inner end, providing a groove 57. In grooves 57 in the two stops, there are positioned respective opposite ends of a spring 58, which ends are secured in the corresponding grooves 57 by means of a respective pin 59 fastened in the bifurcated end of each of the stops 52. Spring 58 extends downwardly from the stops 52, and the mid-portion of this spring encircles a pin 60 which is positioned in the longitudinally extending aligned slots 61 provided in the two arms of release plug 23'. The spring 58 is contained within the slot 26' between the two arms of plug 23'. Spring 58 serves not only to connect release plug 23' to the stops 52, but also to tend to bias the stops outwardly and downwardly, when the latter are in the position illustrated in FIGURE 10.

Each stop 52 contains, in a longitudinal slot provided in the respective stop, a rod 62 having at one end thereof a T-head 63 which abuts pin 55. The opposite end of each of the rods 62 extends into the bore 64 of a respective button 65, which is slidably secured in its respective stop 52 in such a way that it can move outwardly a limited distance, but cannot be forced from its respective stop. A spring 66 encircles respectively each rod 62, these springs abutting the respective T-head 63 at one end thereof and abutting the inner surface of the respective button 65 at the other end thereof. A drilled recess 67 is contained in each button 65, at the outer end thereof. It is desired to be pointed out that the stops 52 can rotate about pin 55, and can be cammed upwardly and inwardly to by-pass obstructions in the tubing string, as the caliper and release assembly are lowered downwardly in the tubing. However, when the longitudinal axes of the stops 52 are parallel (which is not the case shown in FIGURE 10), the distance from the outer end of one stop to the outer end of the other stop is greater than the diameter of the tubing string, so the release assembly cannot be pulled upwardly in the tubing until a series of operations, as explained hereinafter, has occurred.

In operation, the modified release assembly A' is connected up to a wire line and a tubing caliper in exactly the same manner as in the case of the first embodiment (previously described), and the entire assembly is lowered into the tubing string. As obstructions are encountered during this downward displacement, stops 52 are cammed inwardly, against the force exerted by spring 58. When the obstructions have been passed, the stops return to the "run" position illustrated in FIGURE 10, so that button 65 on each of the stops rides along the internal surface of the tubing. In this connection, it is pointed out that the spring-loaded buttons 65 are provided mainly to present wear surfaces against the tubing wall as the caliper is moved in either direction. When the release assembly is operated, the buttons 65 are pushed inwardly to permit the sharp edges of the stops 52 (that define the holes in which the buttons operate) to "bite" into the tubing wall.

When the desired level in the tubing string is reached and it is desired to commence calipering operations, the release assembly A' is pulled upwardly, which action causes each button 65 to be cammed inwardly, in opposition to the force exerted by its corresponding spring 66. This camming or pushing inwardly of the buttons 65 occurs due to the binding of the stops 52 in the tubing when upward movement of the release assembly tends to occur. Since the body 1 and supporting members 50 are moving upwardly, while stops 52 and pin 55 remain stationary, the pin 55 moves downwardly in grooves 51 from the "run" position of FIGURE 10 (see FIGURE 13, which illustrates the position of the center line of the axis of pin 55 in grooves 51 at the instant the various indicated operations occur, during the use of the release assembly A') to a "Free Travel" position, during the camming inwardly of buttons 65.

However, even when buttons 65 have been forced inwardly to the maximum extent, the distance from the outer end of one stop 52 to that of the other stop is still greater than the diameter of the tubing, and the release assembly still cannot be moved upwardly in the tubing. A continued upwardly directed force exerted on the release assembly A' causes pin 55 (and, hence, the stops 52) to move downwardly in grooves 51 until sleeve 56 of each of the stops is positioned in portions 51b and 51c of the grooves. This latter motion occurs because stops 52 are still binding in the tubing, while body 1 and members 50 are moving upwardly. In this connection, it is to be noted that pin 55 remains, for all practical purposes, in the center of grooves 51, due to the force exerted on it in one direction by spring 66 of one stop 52, and in the opposite direction by spring 66 of the other stop. This last-mentioned downward motion of pin 55 is from a "Free Travel" position in FIGURE 13 toward the "Flipped" position in this same figure.

When sleeves 56 are positioned in the portions 51b and 51c of grooves 51 and continued upward force is applied to the release assembly, the body member 1 moves upwardly with respect to pin 55 and the stops 52, "flipping" the stops 52 over to a position (illustrated in FIGURE 14) wherein they are directed downwardly and outwardly. This is possible due to the fact that sleeves 56 each have therein a slot which opens or is directed toward the outermost end of the respective stop. At the same time, the enlarged portions 51b and 51c of grooves 51 permit sidewise movement of pin 55 to take place, if required. Thus, the sleeves 56 and the stops 52 can move radially to a limited extent with respect to body 1, the pin 55 remaining for all practical purposes in the center of groove 51. The pin 55 is now in the "Flipped" position illustrated in dotted lines in FIGURE 13, at the extreme lower end of grooves 51.

The "flipping" of stops 52 over to a position wherein they are directed downwardly and outwardly prevents any substantial subsequent downward movement of the caliper in the tubing, or, in other words, it hangs the caliper tool in the tubing string. When the stop members 52 are directed downwardly and outwardly, any substantial downward movement of the caliper would cause these members to "bite" more firmly into the tubing string, thus locking the caliper against downward movement, should the wire line become broken or disconnected.

After the stops 52 have been "flipped" by upward pull on the release assembly, as above described, the body 1 is forced downwardly, just as in the first embodiment of the invention described. This action is now opposed by the stops 52, due to the fact that they are now engaging the tubing in a downwardly extending direction. This action causes pin 55 and sleeves 56 to move relatively upwardly in grooves 51 to the approximate "Release Position" indicated in FIGURE 13. As this (relative) upward movement of pin 55 in grooves 51 takes place, corresponding (relative) upward movement of pins 59 and spring 58 occurs, moving pin 60 upwardly in slots 61 of the release plug 23' until such pin engages the upper end of these slots (which it does about when pin 55 is in the "Release Position" indicated in FIGURE 13). As pin 55 moves further upwardly in grooves 51, toward the "Released" position indicated in FIGURE 13 (due to the continued forced movement of body 1 downwardly), pin 60 is caused by spring 58 to move further upwardly, also. Pin 60, now engaging the upper end of slots 61 and moving upwardly, moves the release plug 23' upwardly so that its lower portion 24 moves out of engagement with collet 32. This latter occurs about when pin 55 is in the "Released" position indicated in FIGURE 13, wherein such pin is at the extreme upper end of grooves 51.

As explained previously, in connection with the first embodiment of the invention, this moving of the release plug upwardly from within the collet arms permits the collet 32, and also the plunger 34, to move downwardly, thereby releasing the feelers for movement to the operative or feeler-extended position. FIGURE 14 illustrates the positions of the various parts in the "released" or feeler-extended position.

It is desired to be pointed out that when the stops 52 and pin 55 move downwardly in grooves 51, pin 60 is moved downwardly in slots 61 (due to the downward movement of pins 59 and spring 58), this downward movement being unopposed due to the length of slots 61 in the release plug 23'.

When the body 1 is drawn upwardly by means of the wire line to begin the calipering operation (after release of the feelers takes place), pin 55 moves downwardly in grooves 51 to the extreme lower end of these grooves, due to the slight resistance to even upward movement of the stops 52 under these conditions. The pin 55 then comes to rest in the "Calipering" position illustrated in dotted lines in FIGURE 13. During the upward (operative or calipering) movement of the body 1, stops 52 are cammed inwardly into the slot 4 as obstructions are encountered.

During calipering movement, the sleeves 56 are free to move laterally to the extent permitted by the portions 51b and 51c of the grooves 51, to minimize any tendency of the stops 52 to interfere with calipering operation proper. It is quite important to allow the caliper feelers themselves to "center" the feeler head, to obtain accurate and reliable readings.

The invention claimed is:

1. In an internal tube wall calipering and recording device adapted to be passed through an extended length of tubing, said device including a plurality of feelers arranged in a feeler head assembly and mounted for movement from a feeler-retracted position out of contact with the tubing wall to a feeler-extended position for contact with the tubing wall: a mechanism for releasing said feelers for movement from the feeler-retracted position to the feeler-extended position comprising an elongated hollow body member adapted to be secured to the feeler head assembly, a plunger mounted within said body member for longitudinal movement with respect thereto, a feeler controlling member secured to said plunger, said controlling member releasing said feelers for movement to a feeler-extended position in response to movement in a predetermined direction of said plunger with respect to said body member, a releasable retaining member mounted within said body member and originally locked in position therein, said retaining member engaging said plunger to prevent movement of the latter in said predetermined direction, a contacting member movable longitudinally with respect to said body member and extending beyond the outer surface of said body member to firmly contact the tubing wall, and means operated by said contacting member, in response to a downward longitudinal movement of said body member with respect to said contacting member, to unlock said retaining member, thereby to release said plunger for movement in said predetermined direction.

2. A mechanism as defined in claim 1, wherein the last-mentioned means includes a slidable member movable by said contacting member from a first position in which it locks said retaining member in position to a second position wherein said retaining member is unlocked.

3. In an internal tube wall calipering and recording device adapted to be passed through an extended length of tubing, said device including a plurality of feelers arranged in a feeler head assembly and mounted for movement from a feeler-retracted position out of contact with the tubing wall to a feeler-extended position for contact with the tubing wall: a mechanism for releasing said feelers for movement from the feeler-retracted position to the feeler-extended position comprising an elongated hollow body member adapted to be secured to the feeler head assembly, a plunger mounted within said body member for longitudinal movement with respect thereto, a feeler controlling member secured to said plunger, said controlling member releasing said feelers for movement to a feeler-extended position in response to movement in a predetermined direction of said plunger with respect to said body member, a collet adapted to originally engage said body member, thereby to be retained in position in such member, said collet engaging said plunger to originally prevent movement of said plunger in said predetermined direction, a plug member originally positioned within said collet to maintain the same in engagement with said body member but being movable to a position in which it is ineffective to maintain said collet in engagement with said body member, and means acting in response to a downward movement of said body member to move said plug member to said last-mentioned position, thereby to release said collet from engagement with said body member and to release said plunger for movement in said predetermined direction.

4. In an internal tube wall calipering and recording device adapted to be passed through an extended length of tubing, said device including a plurality of feelers arranged in a feeler head assembly and mounted for movement from a feeler-retracted position out of contact with the tubing wall to a feeler-extended position for contact with the tubing wall: a mechanism for releasing said feelers for movement from the feeler-retracted position to the feeler-extended position comprising an elongated hollow body member adapted to be secured to the feeler head assembly, a plunger mounted within said body member for longitudinal movement with respect thereto, a feeler controlling member controlling member secured to said plunger, said controlling member releasing said feelers for movement to a feeler-extended position in response to movement in a predetermined direction of said plunger with respect to said body member, a pair of contacting members mounted for conjoint longitudinal movement with respect to said body member and extending beyond the outer surface of said body member at respective diametrically opposite sides thereof to contact the tubing wall, at least one of said contacting members being movable, in response to an initial upward movement of said body member, to a position wherein it firmly contacts the tubing wall to prevent any substantial subsequent downward movement of said calipering device, means mounted within said body member and arranged to originally prevent movement of said plunger in said predetermined direction, and means operated by said one contacting member, in response to a downward longitudinal movement of said body member with respect to said contacting members, to release said movement preventing means for movement to an ineffective position, thereby to release said plunger for movement in said predetermined direction.

5. A release assembly for a tubing caliper comprising an elongated hollow body member adapted to be secured at its lower end to the feeler head assembly of a tubing caliper, a collet having arms adapted to originally engage said body member, thereby to be retained in position in such member, a plunger positioned on the collet portion of said collet, said plunger being adapted to be secured to a tubing feeler controlling member, a plug member originally positioned within the collet arms to maintain the same in engagement with said body member but being movable with respect to said body member to a position in which it is ineffective to maintain the collet arms in engagement with said body member, and means acting in response to a downward movement of said body member to move said plug member to said last-mentioned position, thereby to release said collet arms from engagement with said body member and to release said collet and said plunger for movement with respect to said body member.

6. A release assembly in accordance with claim 5, wherein the last-mentioned means includes at least one contacting member mounted for longitudinal movement with respect to said body member and extending beyond the outer surface of said body member to firmly contact the tubing wall.

7. In an internal tube wall calipering and recording device adapted to be passed through an extended length of tubing, said device including a plurality of feelers arranged in a feeler head assembly and mounted for movement from a feeler-retracted position out of contact with the tubing wall to a feeler-extended position for contact with the tubing wall: a mechanism for releasing said feelers for movement from the feeler-retracted position to the feeler-extended position comprising an elongated hollow body member adapted to be secured to the feeler head assembly, a plunger mounted within said body member for longitudinal movement with respect thereto, a feeler controlling member secured to said plunger, said controlling member releasing said feelers for movement to a feeler-extended position in response to movement in a predetermined direction of said plunger with respect to said body member, a pair of contacting members mounted for conjoint longitudinal movement with respect to said body member and extending beyond the outer surface of said body member at respective diametrically opposite sides thereof to contact the tubing wall, a releasable retaining member mounted within said body member and originally locked in position therein, said retaining member engaging said plunger to prevent movement of the latter in said predetermined direction, and means operated by at least one of said contacting members, in response to a downward longitudinal movement of said body member with respect to said contacting members, to unlock said retaining member, thereby to release said plunger for movement in said predetermined direction.

8. A mechanism as defined in claim 7, wherein the last-mentioned means includes a slidable member movable by said one contacting member from a first position in which it locks said retaining member in position to a second position, wherein said retaining member is unlocked.

9. In an internal tube wall calipering and recording device adapted to be passed through an extended length of tubing, said device including a plurality of feelers arranged in a feeler head assembly and mounted for movement from a feeler-retracted position out of contact with the tubing wall to a feeler-extended position for contact with the tubing wall: a mechanism for releasing said feelers for movement from the feeler-retracted position to the feeler-extended position comprising an elongated hollow body member adapted to be secured to the feeler head assembly, a plunger mounted within said body member for longitudinal movement with respect thereto, a feeler controlling member secured to said plunger, said controlling member releasing said feelers for movement to a feeler-extended position in response to movement in a predetermined direction of said plunger with respect to said body member, a pair of contacting members mounted for conjoint longitudinal movement with respect to said body member and extending beyond the outer surface of said body member at respective diametrically opposite sides thereof to contact the tubing wall, at least one of said contacting members being movable, in response to an initial upward movement of said body member, to a position wherein it firmly contacts the tubing wall to prevent any substantial subsequent downward movement of said calipering device, resilient means for biasing one of said contacting members outwardly with respect to the other of said contacting members, means mounted within said body member and arranged to originally prevent movement of said plunger in said predetermined direction, and means operated by said one contacting member, in response to a downward longitudinal movement of said body member with respect to said contacting members, to release said movement preventing means for movement to an ineffective position, thereby to release said plunger for movement in said predetermined direction.

10. A mechanism as defined in claim 9, wherein said other contacting member is bifurcated, and wherein said one contacting member comprises a wheel eccentrically mounted in said other contacting member, said wheel being rotatable about its eccentric mounting in response to said initial upward movement of said body member.

11. A mechanism as defined in claim 9, wherein said one contacting member comprises a stop member mounted for pivotal movement in said body member, said stop member being rotatable about its pivotal mounting in response to said initial upward movement of said body member.

12. In an internal tube wall calipering and recording device adapted to be passed through an extended length of tubing, said device including a plurality of feelers arranged in a feeler head assembly and mounted for movement from a feeler-retracted position out of contact with the tubing wall to a feeler-extended position for contact with the tubing wall: a mechanism for releasing said feelers for movement from the feeler-retracted position to the feeler-extended position comprising an elongated hollow body member adapted to be secured to the feeler head assembly, a plunger mounted within said body member for longitudinal movement with respect thereto, a feeler controlling member secured to said plunger, said controlling member releasing said feelers for movement to a feeler-extended position in response to movement in a predetermined direction of said plunger with respect to said body member, a pair of contacting members mounted for conjoint longitudinal movement with respect to said body member and extending beyond the outer surface of said body member at respective diametrically opposite sides thereof to contact the tubing wall, one of said contacting members being movable, in response to an initial upward movement of said body member, to a position wherein it firmly contacts the tubing wall to prevent any substantial subsequent downward movement of said calipering device, resilient means for biasing one of said contacting members outwardly with respect to the other of said contacting members, a releasable retaining member mounted within said body member and originally locked in position therein, said retaining member engaging said plunger to prevent movement of the latter in said predetermined direction, and means operated by said one contacting member, in response to a downward longitudinal movement of said body member with respect to said contacting members, to unlock said retaining member, thereby to release said plunger for movement in said predetermined direction.

13. A mechanism as defined in claim 12, wherein said other contacting member is bifurcated, and wherein said one contacting member comprises a wheel eccentrically mounted in said other contacting member, said wheel being rotatable about its eccentric mounting in response to said initial upward movement of said body member.

14. A mechanism as defined in claim 12, wherein said other contacting member is bifurcated, and wherein said one contacting member comprises a wheel eccentrically mounted in said other contacting member, said wheel being rotatable about its eccentric mounting in response to said initial upward movement of said body member, and wherein the last-mentioned means includes a slidable member movable by said wheel from a first position in which it locks said retaining member in position to a second position wherein said retaining member is unlocked.

15. A mechanism as defined in claim 12, wherein said one contacting member comprises a stop member mounted for pivotal movement in said body member, said stop member being rotatable about its pivotal mounting in response to said initial upward movement of said body member.

16. A mechanism as defined in claim 12, wherein said one contacting member comprises a stop member mounted for pivotal movement in said body member, said stop member being rotatable about its pivotal mounting in response to said initial upward movement of said body member, and wherein the last-mentioned means includes a slidable member movable by said stop member from a first position in which it locks said retaining member in position to a second position wherein said retaining member is unlocked.

17. A release assembly for a tubing caliper comprising an elongated hollow body member adapted to be secured at its lower end to the feeler head assembly of a tubing caliper, a collet having arms adapted to originally engage said body member, thereby to be retained in position in such member, a plunger positioned on the collet portion of said collet, said plunger being adapted to be secured to a tubing feeler controlling member, a plug member originally positioned within the collet arms to maintain the same in engagement with said body member but being movable with respect to said body member to a position in which it is ineffective to maintain the collet arms in engagement with said body member, and a contacting member mounted for longitudinal movement with respect to said body member and extending beyond the outer surface of said body member to firmly contact the tubing wall, said contacting member acting, in response to a downward longitudinal movement of said body member with respect to said contacting member, to move said plug member to said last-mentioned position, thereby to release said collet arms from engagement with said body member.

18. A release assembly for a tubing caliper comprising an elongated hollow body member adapted to be secured at its lower end to the feeler head assembly of a tubing caliper, a collet having arms adapted to originally engage said body member, thereby to be retained in position in such member, a plunger positioned on the collet portion of said collet, said plunger being adapted to be secured to a tubing feeler controlling member, a plug member originally positioned within the collet arms to maintain the same in engagement with said body member but being movable with respect to said body member to a position in which it is ineffective to maintain the collet arms in engagement with said body member, and a pair of contacting members mounted for conjoint longitudinal movement with respect to said body member and extending beyond the outer surface of said body member at respective diametrically opposite sides thereof to contact the tubing wall, at least one of said contacting members acting, in response to a downward longitudinal movement of said body member with respect to said contacting members, to move said plug member to said last-mentioned position, thereby to release said collet arms from engagement with said body member.

19. A release assembly for a tubing caliper comprising an elongated hollow body member adapted to be secured at its lower end to the feeler head assembly of a tubing caliper, a collet having arms adapted to originally engage said body member, thereby to be retained in position in such member, a plunger positioned on the collet portion of said collet, said plunger being adapted to be secured to a tubing feeler controlling member, a plug member originally positioned within the collet arms to maintain the same in engagement with said body member but being movable with respect to said body member to a position in which it is ineffective to maintain the collet arms in engagement with said body member, and a pair of contacting members mounted for conjoint longitudinal movement with respect to said body member and extending beyond the outer surface of said body member at respective diametrically opposite sides thereof to contact the tubing wall, at least one of said contacting members being movable, in response to an initial upward movement of said body member, to a position wherein it firmly contacts the tubing wall to prevent any substantial subsequent downward movement of said caliper, said one contacting member acting, in response to a downward longitudinal movement of said body member with respect to said contacting members, to move said plug member to said last-mentioned position, thereby to release said collet arms from engagement with said body member.

20. An assembly in accordance with claim 19, wherein said one contacting member comprises a stop member mounted for pivotal movement in said body member, said stop member being rotatable about its pivotal mounting in response to said initial upward movement of said body member.

21. An assembly in accordance with claim 19, wherein the other contacting member is bifurcated, and wherein said one contacting member comprises a wheel eccentrically mounted in said other contacting member, said wheel being rotatable about its eccentric mounting in response to said initial upward movement of said body member.

22. A release assembly for a tubing caliper comprising an elongated hollow body member adapted to be secured at its lower end to the feeler head assembly of a tubing caliper, a collet having arms adapted to originally engage said body member, thereby to be retained in position in such member, a plunger positioned on the collet portion of said collet, said plunger being adapted to be secured to a tubing feeler controlling member, a plug member originally positioned within the collet arms to maintain the same in engagement with said body member but being movable with respect to said body member to a position in which it is ineffective to maintain the collet arms in engagement with said body member, a pair of contacting members mounted for conjoint longitudinal movement with respect to said body member and extending beyond the outer surface of said body member at respective diametrically opposite sides thereof to contact the tubing wall, one of said contacting members being a wheel eccentrically mounted in the other contacting member, said other contacting member being bifurcated to accommodate said wheel therein, said wheel being rotatable about its eccentric mounting in response to an initial upward movement of said body member, to a position wherein it firmly contacts the tubing wall to prevent any substantial subsequent downward movement of said caliper; and resilient means for biasing said wheel outwardly with respect to the other of said contacting members, said wheel acting, in response to a downward longitudinal movement of said body member with respect to said contacting members, to move said plug member to said last-mentioned position, thereby to release said collet arms from engagement with said body member.

23. A release assembly for a tubing caliper comprising an elongated hollow body member adapted to be secured at its lower end to the feeler head assembly of a tubing caliper, a collet having arms adapted to originally engage said body member, thereby to be retained in position in such member, a plunger positioned on the collet portion of said collet, said plunger being adapted to be secured to a tubing feeler controlling member, a plug member originally positioned within the collet arms to maintain the same in engagement with said body member but being movable with respect to said body member to a position in which it is ineffective to maintain the collet arms in engagement with said body member, a pair of contacting members mounted for conjoint longitudinal movement with respect to said body member and extending beyond the outer surface of said body member at respective diametrically opposite sides thereof to contact the tubing wall, one of said contacting members being a stop member mounted for pivotal movement in said body member, said stop member being rotatable about its pivotal mounting in response to an initial upward movement of said body member, to a position wherein it firmly contacts the tubing wall to prevent any substantial subsequent downward movement of said caliper; and resilient means for biasing said stop member outwardly with respect to the other of said contacting members, said stop member acting, in response to a downward longitudinal movement of said body member with respect to said contacting members, to move said plug member to said last-mentioned position, thereby to release said collet arms from engagement with said body member.

References Cited in the file of this patent

UNITED STATES PATENTS

| | | |
|---|---|---|
| 2,638,681 | Kinley et al. | May 19, 1953 |
| 2,708,316 | Fredd | May 17, 1955 |
| 2,947,086 | Boyle | Aug. 2, 1960 |